(12) United States Patent
Kashu

(10) Patent No.: US 12,470,808 B2
(45) Date of Patent: Nov. 11, 2025

(54) DISPLAY CONTROL APPARATUS AND DISPLAY CONTROL METHOD THEREFOR

(71) Applicant: CANON KABUSHIKI KAISHA, Tokyo (JP)

(72) Inventor: Ryota Kashu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 149 days.

(21) Appl. No.: 18/475,044

(22) Filed: Sep. 26, 2023

(65) Prior Publication Data

US 2024/0137645 A1    Apr. 25, 2024

(30) Foreign Application Priority Data

Sep. 29, 2022    (JP) .................... 2022-156671

(51) Int. Cl.
| | | |
|---|---|---|
| H04N 23/63 | (2023.01) | |
| H04N 23/667 | (2023.01) | |
| H04N 23/67 | (2023.01) | |

(52) U.S. Cl.
CPC ......... H04N 23/635 (2023.01); H04N 23/667 (2023.01); H04N 23/67 (2023.01)

(58) Field of Classification Search
CPC .... H04N 23/635; H04N 23/667; H04N 23/67; H04N 23/632; H04N 23/672; H04N 23/611; G03B 13/30; G03B 13/36
See application file for complete search history.

(56) References Cited

U.S. PATENT DOCUMENTS

| | | | |
|---|---|---|---|
| 9,888,182 B2 | 2/2018 | Sawa | |
| 2010/0149369 A1 | 6/2010 | Yasuda | |
| 2012/0019703 A1* | 1/2012 | Thorn | H04N 23/632 |
| | | | 348/E5.022 |
| 2012/0147252 A1* | 6/2012 | Kunishige | H04N 23/667 |
| | | | 348/E5.045 |
| 2014/0198230 A1* | 7/2014 | Tsutsumi | H04N 23/45 |
| | | | 348/218.1 |
| 2014/0226039 A1* | 8/2014 | Yamamoto | H04N 23/672 |
| | | | 348/239 |
| 2021/0258495 A1 | 8/2021 | Yoshie | |
| 2024/0171853 A1* | 5/2024 | Tahara | H04N 23/60 |

FOREIGN PATENT DOCUMENTS

| | | |
|---|---|---|
| JP | 2001215403 A | 8/2001 |
| JP | 2006253998 A | 9/2006 |
| JP | 4839908 B2 | 12/2011 |

* cited by examiner

*Primary Examiner* — Shahbaz Nazrul
(74) *Attorney, Agent, or Firm* — Canon U.S.A., Inc., IP Division

(57) ABSTRACT

The control method includes determining whether a plurality of pupils can be included in a specific depth in a case where pupil information about the plurality of pupils of a same subject is acquired, and in a case where it is determined in the determining that the plurality of pupils of the same subject cannot be included in the specific depth, control is performed so that different indexes are displayed on a pupil within the specific depth and a pupil outside the specific depth.

9 Claims, 12 Drawing Sheets

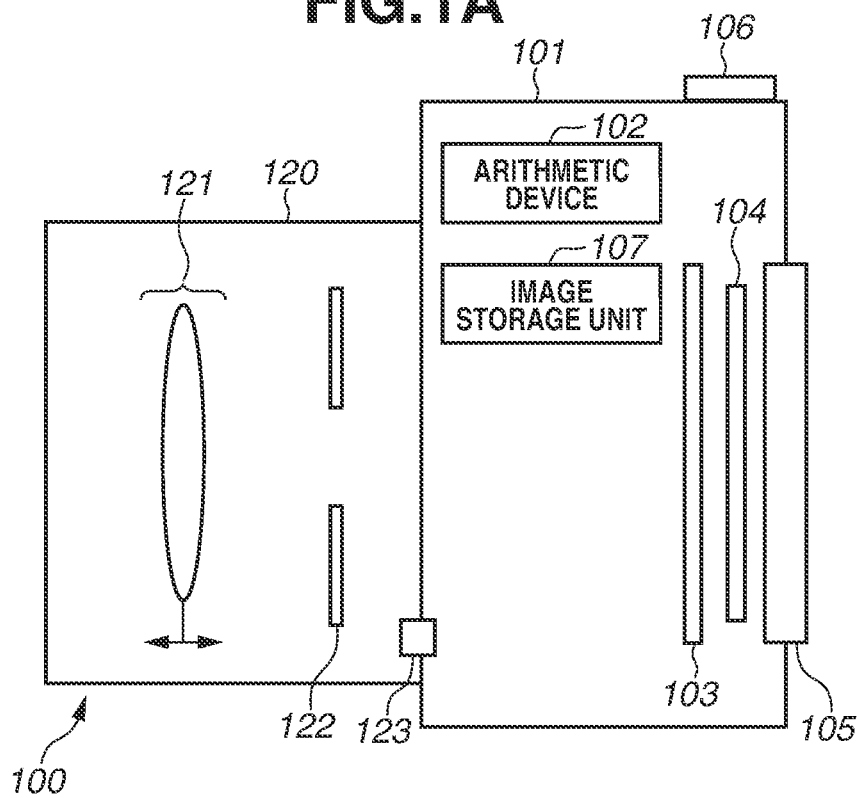
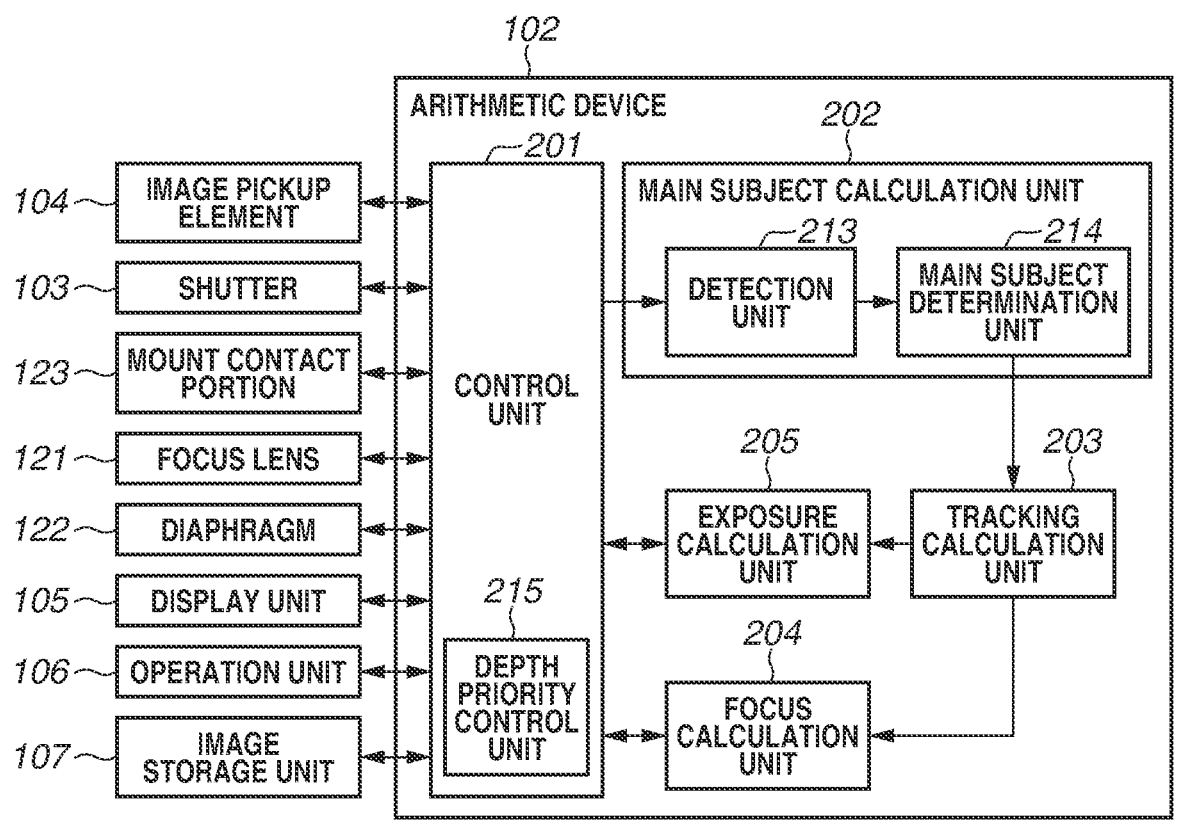

FIG.2A

BAYER ARRAY EXAMPLE PIXEL STRUCTURE

| R  | Gr | R  | Gr | R  | Gr | R  | Gr | R  | Gr |
|----|----|----|----|----|----|----|----|----|----|
| Gb | B  | Gb | B  | Gb | B  | Gb | B  | Gb | B  |

FIG.2B

IMAGE PICKUP PLANE PHASE DIFFERENCE SYSTEM PIXEL STRUCTURE

| R A | R B | Gr A | Gr B | R A | R B | Gr A | Gr B | R A | R B | Gr A | Gr B | R A | R B | Gr A | Gr B | R A | R B | Gr A | Gr B |
|-----|-----|------|------|-----|-----|------|------|-----|-----|------|------|-----|-----|------|------|-----|-----|------|------|
| Gb A | Gb B | B A | B B | Gb A | Gb B | B A | B B | Gb A | Gb B | B A | B B | Gb A | Gb B | B A | B B | Gb A | Gb B | B A | B B |

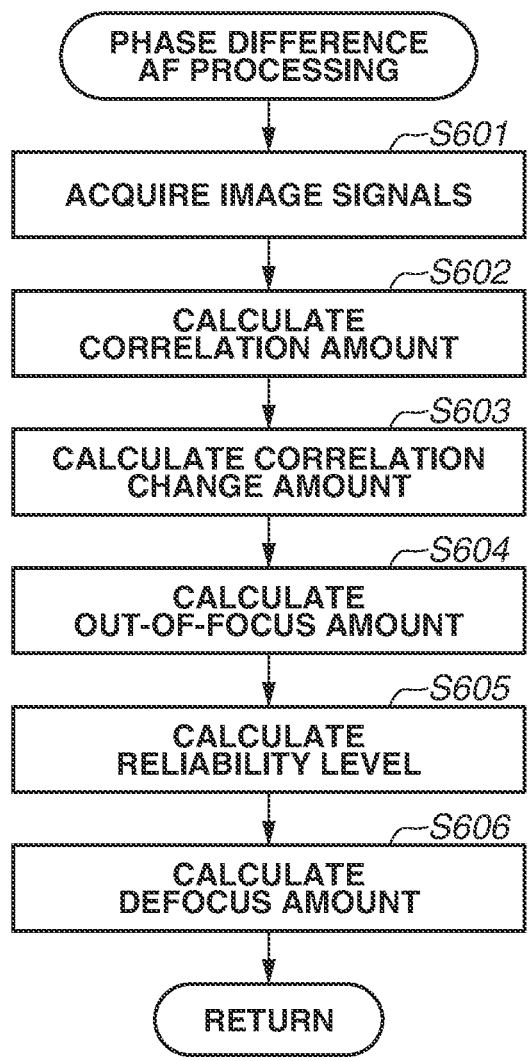

FIG.8A
WHEN BOTH PUPILS ARE WITHIN SPECIFIC DEPTH
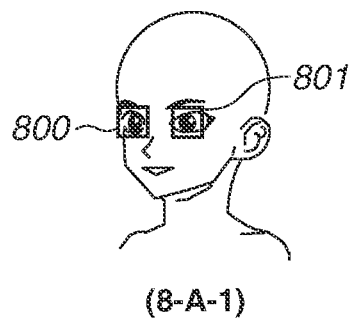
(8-A-1)
FIG.8B
WHEN ONLY ONE PUPIL IS WITHIN SPECIFIC DEPTH
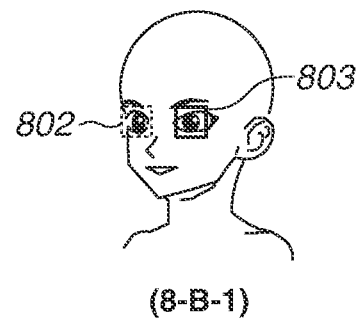
(8-B-1)
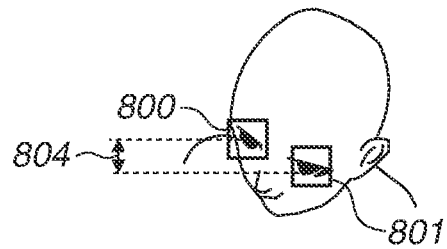
(8-A-2)
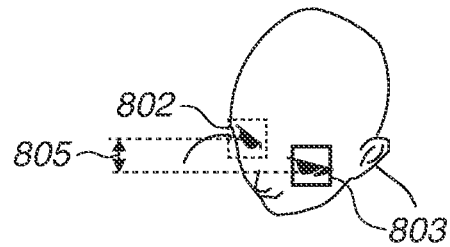
(8-B-2)

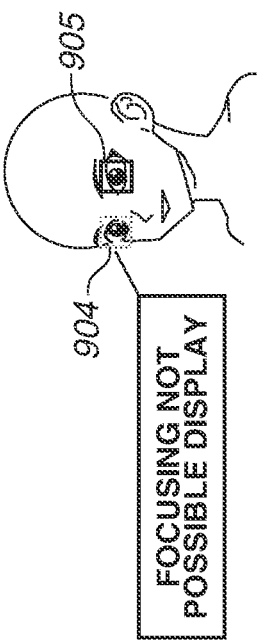
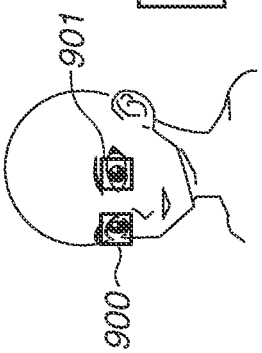
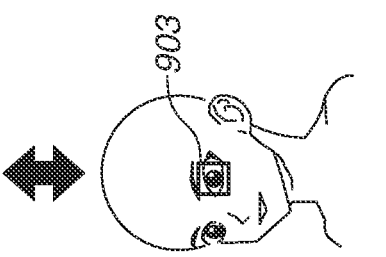
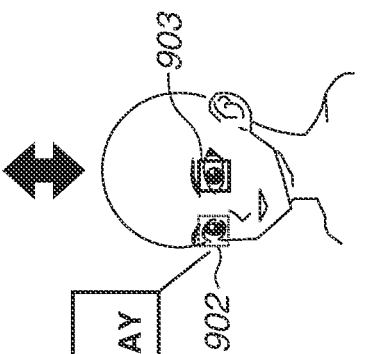

FIG.12
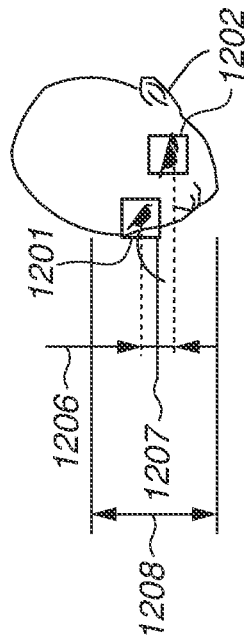
(12-1) WHEN SUBJECT IS STATIONARY
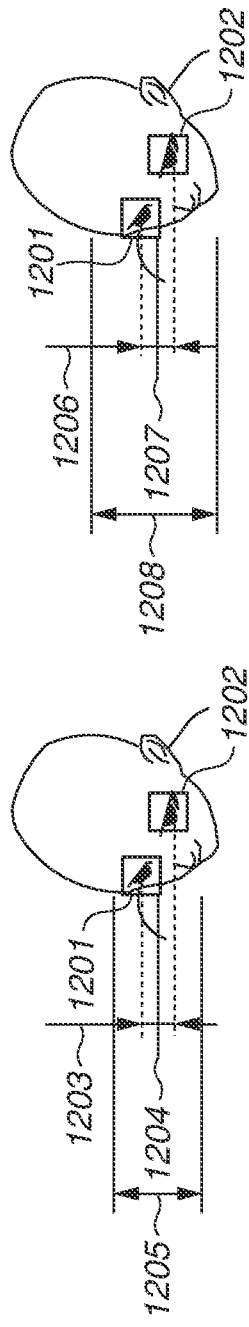
(12-2) WHEN SUBJECT IS MOVING

DISPLAY CONTROL APPARATUS AND DISPLAY CONTROL METHOD THEREFOR

BACKGROUND OF THE INVENTION

Field of the Invention

The present invention relates to a display function indicating a focus state in an image.

Description of the Related Art

Conventionally, in an imaging apparatus, such as a digital camera, there is known a technique called pupil autofocus (AF) in which a pupil of a human or an animal (dog, cat, bird, etc.) in an image obtained from an image pickup element is detected, and the pupil is brought into focus. A conventional pupil AF function is a function of focusing on either a left or right pupil, and focusing on a pupil that is not a focusing target is not guaranteed. However, particularly in portrait image capturing of a person in which the pupil AF is often used, there is not only a need to focus on one pupil but also a need to focus on both the left and right pupils in image capturing. In such a use case, there is also a need to know whether it is possible to bring both the left and right pupils into focus.

To meet such needs, Japanese Patent Application Laid-Open No. 2001-215403 discusses a technique for performing depth control so that both pupils of a plurality of humans are within a depth of field. When all the pupils cannot be included in the depth of field, focus control is performed so that as many pupils as possible are included in the depth of field.

However, Japanese Patent Application Laid-Open No. 2001-215403 does not discuss, with respect to a plurality of pupils, suitable display indicating an in-focus state or display with respect to a pupil that cannot be included in the depth of field. In addition, since suitable display indicating whether the plurality of pupils can be included in the depth of field is not performed, it is difficult for a user to select whether to focus on the plurality of pupils or to focus on only a specific pupil.

SUMMARY OF THE INVENTION

Therefore, the present invention is directed to providing a display control apparatus and a control method therefor that enable display of a suitable focus state.

According to an aspect of the present invention, a display control apparatus includes an acquisition unit configured to acquire pupil information from an image obtained by an image capturing unit configured to capture a subject image obtained via an imaging optical system, a focus detection unit configured to detect a focus state of a subject, a display control unit configured to perform control to display an index on a display screen based on the pupil information acquired by the acquisition unit, and a determination unit configured to determine whether a plurality of pupils can be included in a specific depth in a case where pupil information about the plurality of pupils of a same subject is acquired by the acquisition unit, wherein, in a case where it is determined by the determination unit that the plurality of pupils of the same subject cannot be included in the specific depth, the display control unit performs control so that different indexes are displayed on a pupil within the specific depth and a pupil outside the specific depth.

Further features of the present invention will become apparent from the following description of exemplary embodiments with reference to the attached drawings.

BRIEF DESCRIPTION OF THE DRAWINGS

FIG. 1A is a cross-sectional side view illustrating a configuration of a digital single-lens reflex camera according to a first exemplary embodiment. FIG. 1B is a block diagram illustrating an electrical configuration of the digital single-lens reflex camera.

FIGS. 2A and 2B are diagrams each illustrating a partial region of an image sensor.

FIG. 6 is a flowchart of phase difference autofocus (AF) processing.

FIGS. 8A and 8B are diagrams illustrating frame display examples according to the first exemplary embodiment.

FIGS. 9A and 9B are diagrams illustrating frame display examples according to a second exemplary embodiment.

FIG. 12 is a diagram for explaining control according to a fourth exemplary embodiment.

DESCRIPTION OF THE EMBODIMENTS

Figure 3A:
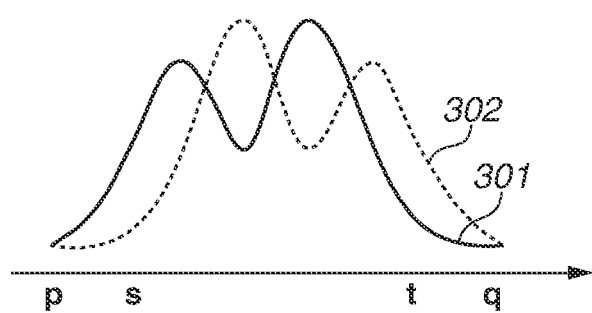
FIGS. 3A, 3B, 3C, and 3D are diagrams illustrating image signals obtained from detection areas for detecting a defocus amount.

Exemplary embodiments of the present invention will now be described in detail with reference to the accompanying drawings.

Configuration of Display Control Apparatus

In a first exemplary embodiment, an example in which the present invention is applied to a digital single-lens reflex camera (hereinafter, also simply referred to as a camera) 100, which is one exemplary embodiment of a display control apparatus of the present invention, will be described.

FIG. 1A is a cross-sectional side view illustrating a configuration of a camera 100. FIG. 1B is a block diagram illustrating an electrical configuration of the camera 100 in FIG. 1A.

In the camera 100 according to the present exemplary embodiment, as illustrated in FIG. 1A, an interchangeable lens unit 120 that is detachably mountable is mounted on the front side (object side) of a camera body 101. The lens unit 120 includes a focus lens 121, a diaphragm 122, a focus lens driving unit (not illustrated), and a diaphragm driving unit (not illustrated). The lens unit 120 is electrically connected to the camera body 101 via a mount contact portion 123. The focus lens 121 is moved by a focus lens driving unit to perform focus adjustment to form an image on an image pickup element 104 to be described below. The diaphragm 122 is driven by the diaphragm driving unit to control the amount of light incident on the image pickup element 104 to be described below. The focus lens driving unit and the diaphragm driving unit are controlled by a control unit 201 of the camera body 101. The focus lens 121 can also be manually adjusted by a user.

The image pickup element 104 is configured to include a complementary metal-oxide semiconductor (CMOS) sensor, and includes an infrared cut filter or a low-pass filter. The image pickup element 104 photoelectrically converts an object image formed through an imaging optical system of the lens unit 120 at the time of imaging, and outputs a signal for generating a captured image and a signal for performing imaging plane phase difference AF to an arithmetic device 102. The arithmetic device 102 generates a captured image from the acquired signal, stores the captured image in an image storage unit 107, and displays the captured image on a display unit 105, such as a liquid crystal display (LCD). In addition, in the arithmetic device 102, a shutter 103 shields the image pickup element 104 when imaging is not performed and is opened to expose the image pickup element 104 when imaging is performed.

Next, a configuration related to control will be described with reference to FIG. 1B. The arithmetic device 102 includes a dedicated circuit for executing specific arithmetic processing at high speed in addition to a multi-core central processing unit (CPU) capable of processing a plurality of tasks in parallel, a random access memory (RAM), and a read only memory (ROM). These hardware components constitute the arithmetic device 102 including a control unit 201, a main subject calculation unit 202, a tracking calculation unit 203, a focus calculation unit 204, and an exposure calculation unit 205. The control unit 201 controls each component of the camera body 101 and the lens unit 120.

The main subject calculation unit 202 is configured to include a detection unit 213 and a main subject determination unit 214.

The detection unit 213 performs a process of detecting a specific region (e.g., the face or a pupil of a human, or the face or a pupil of an animal) from an image. In some cases, the specific region may not be detected or a plurality of specific regions may be detected. A detector for detecting pupils of humans and animals is included in the detection unit 213. As a detection method, any known method, such as Adaptive Boosting (AdaBoost) or a convolutional neural network, may be used. In addition, as an implementation form thereof, a program running on a CPU, dedicated hardware, or a combination thereof may be used.

A subject detection result obtained from the detection unit 213 is transmitted to the main subject determination unit 214 where a main subject is determined from among detected subjects, and a main subject region is set. Determination of the main subject is performed using a known calculation method based on sizes, positions, and reliability of the detection result. When the specific region is not detected by the detection unit 213, a main subject region to be set as the main subject is determined based on a past detection result, a feature amount such as an edge of a target frame, and defocus information of a subject.

The tracking calculation unit 203 performs tracking of the main subject region based on detection information of the main subject.

The focus calculation unit 204 performs correlation calculation based on the signal for performing imaging plane phase difference AF output from the image pickup element 104, and calculates defocus information (defocus amount and reliability information (two-image matching level, two image steepness, contrast information, saturation information, and defect information)). The calculated defocus information (the defocus amount and the reliability information) is output to the control unit 201. Based on the acquired defocus amount and reliability information, the control unit 201 notifies the focus calculation unit 204 of a change in a setting for calculating the defocus amount and the reliability information. Details of the correlation calculation will be described below with reference to FIGS. 3A to 5B.

The exposure calculation unit 205 calculates control values for the diaphragm 122 and the image pickup element 104 to achieve appropriate exposure of the main subject region.

Next, the control unit 201 receives the results of the exposure calculation unit 205 and the focus calculation unit 204, and controls the focus lens 121, the diaphragm 122, and the display unit 105. The control unit 201 includes a depth priority control unit 215. When a plurality of pupils of humans or animals is being detected, the depth priority control unit 215 uses the detection information from the main subject calculation unit 202 and the defocus information from the focus calculation unit 204 to determine whether the plurality of pupils can be included in a set specific depth. If possible, control values of the lens and the diaphragm in that case are calculated. The focus lens 121 and the diaphragm 122 are controlled based on the calculated control values.

In response to a control result, the display unit 105 performs frame display indicating in-focus or not in focus with respect to the subject on a display screen. Here, the specific depth generally refers to a depth of field, but may be any set depth. A subject within the specific depth (depth of field) is defined as being in focus.

The control unit 201 performs control by exchanging information with the entire camera body 101. In addition to the processing in the camera body 101, various camera functions operated by the user, such as power on/off, change of settings, start of recording, start of AF control, and confirmation of a recorded video image, are executed in response to input from an operation unit 106.

Configuration of Image Pickup Element

FIGS. 2A and 2B illustrate a part of a light receiving surface of the image pickup element 104 as an image sensor. In the image pickup element 104, in order to enable the imaging plane phase difference AF, pixel portions each holding two photodiodes, which are light receiving portions, as photoelectric conversion means for one microlens are arranged in an array.

With this configuration, each pixel portion can receive a light flux obtained by dividing an exit pupil of a lens barrel.

FIG. 2A is a schematic diagram of a part of an image sensor surface of an example of the Bayer array of red (R), blue (B), and green (Gb, Gr) for reference. FIG. 2B illustrates an example of pixel portions in which two photodiodes as photoelectric conversion means are held for one microlens so as to correspond to the array of color filters in FIG. 2A.

The image sensor having such a configuration can output two signals for phase difference AF (hereinafter, also referred to as an A image signal and a B image signal) from each pixel portion.

In addition, a recording signal (A image signal+B image signal) obtained by adding signals of the two photodiodes can also be output. In the case of the added signal, a signal equivalent to output of the image sensor in the example of the Bayer array described in FIG. 2A is output. Using such signals outputted from the image pickup element 104 as an image sensor, the focus calculation unit 204 performs correlation calculation of two image signals to calculate information such as a defocus amount and various types of reliability.

In the present exemplary embodiment, a total of three signals, i.e., a signal for imaging and two signals for phase difference AF, are output from the image pickup element 104. In this respect, the method is not limited to such a method. For example, a total of two signals, i.e., a signal for imaging and one of two signals of the image signals for phase difference AF, may be output. In this case, after outputting, the other of the two signals of the image signals for phase difference AF is calculated using the two signals outputted from the image pickup element 104.

FIGS. 2A and 2B each illustrate an example in which pixel portions each holding two photodiodes as photoelectric conversion means for one microlens are arranged in an array. In this regard, pixel portions each holding three or more photodiodes as photoelectric conversion means for one microlens may be arranged in an array. In addition, a plurality of pixel portions having different opening positions of the light receiving portions with respect to the microlens may be provided. In other words, it is sufficient that two signals for phase difference AF that enable detection of a phase difference, such as the A image signal and the B image signal, are obtained as a result.

Correlation Calculation of Imaging Plane Phase Difference AF Method

Figure 3B:
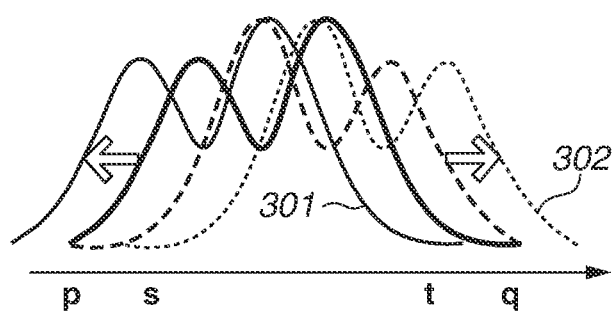
Figure 3C:
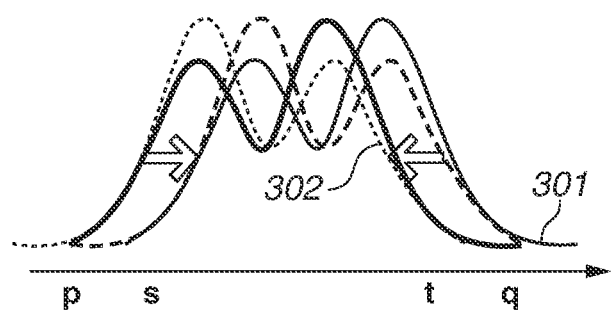
Figure 3D:
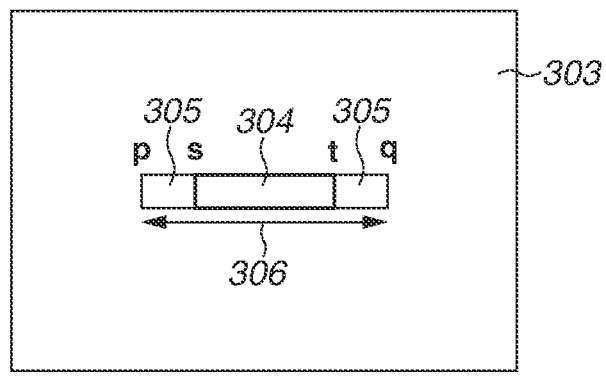

FIG. 3D is a conceptual diagram of the image pickup element 104 as an image sensor on a pixel array, illustrating an area for which image signals are acquired. With respect to a pixel array 303 in which pixel portions (not illustrated) are arranged in an array, a region to be subjected to calculation described below is a region 304. A shift region 305, necessary for correlation calculation for calculating a defocus amount of the region 304, combined with the region 304 is a shift region 306 necessary for performing the correlation calculation.

In FIGS. 3A to 3D and 4A and 4B, p, q, s, and t each represent a coordinate in an x-axis direction, with p to q representing the shift region 306 and s to t representing the region 304.

FIGS. 3A, 3B, and 3C illustrate image signals obtained from the shift region 306 set in FIG. 3D. In the figures, s to t correspond to the region 304, and p to q correspond to the shift region 306, which is a range necessary for calculation of the defocus amount based on a shift amount. FIG. 3A is a diagram conceptually illustrating the A image signal and the B image signal before a shift for the correlation calculation by waveforms.

A solid line 301 represents the A image signal, and a broken line 302 represents the B image signal.

FIG. 3B is a conceptual diagram of a case where image waveforms before the shift in FIG. 3A are mutually shifted in a positive direction, and FIG. 3C is a conceptual diagram of a case where the image waveforms before the shift in FIG. 3A are mutually shifted in a negative direction. When a correlation amount, which is a degree of correlation between two images, is calculated, for example, the A image signal 301 and the B image signal 302 are each shifted one bit in respective directions indicated by arrows.

Next, a method of calculating a correlation amount COR will be described. First, as illustrated in FIGS. 3B and 3C, for example, the A image signal 301 and the B image signal 302 are each shifted one bit, and the sum of absolute values of differences between the A image signal and the B image signal in each state is calculated. In this case, the shift amount is represented by i, the minimum number of shifts is p-s in FIG. 4A, and the maximum number of shifts is q-t in FIG. 4A. Further, x is the start coordinate of the focus detection area, and y is the end coordinate of the focus detection area. The correlation amount COR can be calculated by the following formula (1) using these values.

[Formula 1]

$$COR[i] = \sum_{k=x}^{y} |A[k+i] - B[k-i]| \quad (1)$$

$$\{(p-s) < i < (q-t)\}$$

Figure 4A:
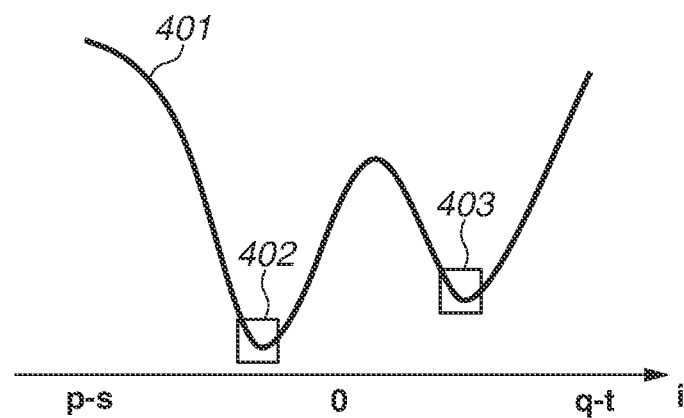
FIGS. 4A and 4B are diagrams illustrating a correlation amount waveform, a correlation change amount waveform, and an out-of-focus amount.

FIG. 4A is a conceptual diagram illustrating the correlation amount in a waveform graph. The horizontal axis of the graph indicates the shift amount, and the vertical axis thereof indicates the correlation amount. In the example diagram, a correlation amount waveform 401 has near-extreme values 402 and 403. Of the extreme values, the smaller the correlation amount is, the higher the matching level between an A image and a B image is.

Next, a method of calculating a correlation change amount ΔCOR will be described. First, from the conceptual diagram of the correlation amount waveform in FIG. 4A, for example, the correlation change amount is calculated from a difference between the correlation amounts of one shift skip. At this time, the shift amount is represented by i, the minimum number of shifts is p-s in FIG. 3D, and the maximum number of shifts is q-t in FIG. 3D. Using these values, the correlation change amount ΔCOR can be calculated by the following formula (2).

[Formula 2]

$$\Delta COR[i] = COR[i-1] - COR[i+1]\{(p-s+1) < i < (q-t-1)\} \quad (2)$$

Figure 4B:
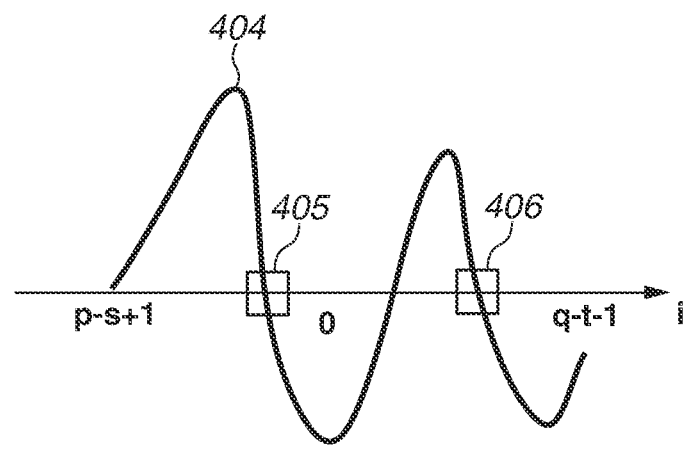

FIG. 4B is a conceptual diagram illustrating the correlation change amount ΔCOR in a waveform graph. The horizontal axis of the graph indicates the shift amount, and the vertical axis thereof indicates the correlation change amount. A correlation change amount waveform 404 has points 405 and 406 at which the correlation change amount changes from positive to negative. A state in which the correlation change amount becomes zero at the point 405 indicates the shift amount between the A image signal and the B image signal with which the degree of coincidence between the A image and the B image is relatively high. The shift amount at that time corresponds to the defocus amount.

Figure 5A:
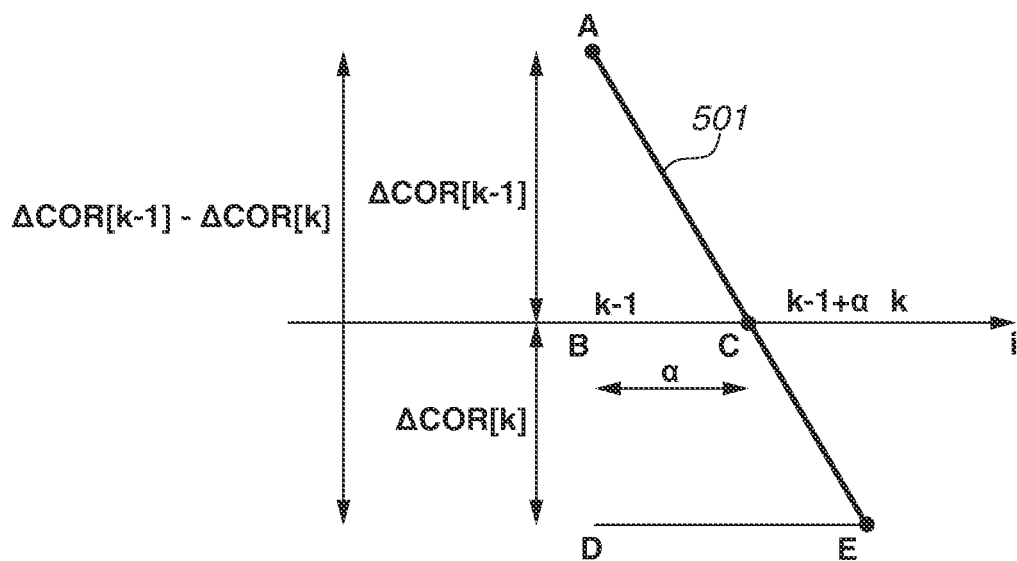
FIGS. 5A and 5B are diagrams illustrating a method of calculating a two-image matching level.

FIG. 5A is an enlarged view of the point 405 in FIG. 4B, where a waveform of a part of the correlation change amount waveform 404 is illustrated as a waveform 501. A method of calculating an out-of-focus amount PRD corresponding to the defocus amount will be exemplified with reference to FIG. 5A. The out-of-focus amount is conceptually divided into an integer part β and a decimal part α. The decimal part α can be calculated by the following formula (3) from the similarity relationship between the triangle ABC and the triangle ADE in FIG. 5A.

[Formula 3]

$$AB:AD = BC:DE \quad (3)$$

-continued $$\Delta COR[k-1]:\Delta COR[k-1] - \Delta COR[k] = \alpha:k - (k-1)$$

$$\alpha = \frac{\Delta COR[k-1]}{\Delta COR[k-1] - \Delta COR[k]}$$

Next, the decimal part β can be calculated from FIG. 5A by the following equation (4).

[Equation 4]

$$\beta = k - 1 \quad (4)$$

As described above, the out-of-focus amount PRD can be calculated from the sum of α and β.

In addition, when there is a plurality of zero-crossings as illustrated in FIG. 4B, a point at which a steepness max der (hereinafter referred to as steepness) of the change in the correlation amount at the zero-crossing is large is set as a first zero-crossing. The steepness is an index indicating ease of AF, and a larger value indicates a point at which AF is more likely to occur. The steepness can be calculated by the following formula (5).

[Formula 5]

$$\max\ der = |\Delta COR[k+1]| + |\Delta COR[k]| \quad (5)$$

As described above, when there is the plurality of zero-crossings, the first zero-crossing is determined by the steepness.

Figure 5B:
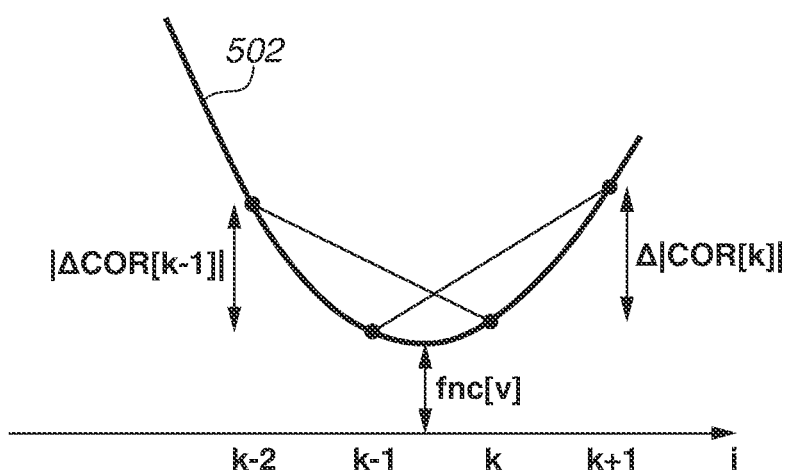

Next, a method of calculating a reliability level of an out-of-focus amount will be exemplified. This corresponds to reliability of the defocus amount. However, the following description is an example, and the reliability level may be calculated by another known method. The reliability can be defined by the above-described steepness and a matching level fnclvl of two images of the A image signal and the B image signal (hereinafter referred to as the two-image matching level). The two-image matching level is an index indicating accuracy of the out-of-focus amount, and the smaller the value, the higher the accuracy. FIG. 5B is an enlarged view of a part of the near-extreme value 402 in FIG. 4A, and illustrates a waveform 502 which is a part of the correlation amount waveform 401. Hereinafter, the method of calculating the steepness and the two-image matching level will be exemplified. The two-image matching level can be calculated by the following formula (6).

[Formula 6]

(i) When |ΔCOR[k−1]|×2≤max der, $$fnclvl = COR[k-1] + \Delta COR[k-1]/4$$

(ii) When |ΔCOR[k−1]|×2>max der, $$fnclvl = COR[k] - \Delta COR[k]/4 \quad (6)$$

Defocus Amount Calculation

FIG. 6 illustrates a flow of a series of processes up to defocus amount calculation. In the following description of an example, the out-of-focus amount and the defocus amount are distinguished and exemplified. In this regard, the defocus amount in the technical concept of the present application may be a concept represented by an absolute distance from the in-focus position or the number of pulses, or may be a concept represented by a dimension or a unit different from that of the absolute distance or the number of pulses, or may be a relative concept. This is a concept that allows a determination of how far away from the in-focus state it is, and how much focus control is required to make it possible to shift to the in-focus state. Acquiring defocus information as such a concept will be described as "acquiring focus information".

In step S601, the A image signal and the B image signal are acquired from pixels at positions of the image pickup element 104 corresponding to the respective regions set as exemplified above. Next, in step S602, a correlation amount is calculated from the acquired image signals. Subsequently, in step S603, a correlation change amount is calculated from the calculated correlation amount. Then, in step S604, the out-of-focus amount is calculated from the calculated correlation change amount. Further, in step S605, the reliability level indicating how reliable the calculated out-of-focus amount is calculated. These processes are performed the number of times corresponding to the number of focus detection areas. Then, in step S606, the out-of-focus amount is converted into a defocus amount for each focus detection area.

Reliability Level of Defocus Amount

Next, the reliability level of the defocus amount in the present exemplary embodiment will be described.

The reliability level of the defocus amount is an indicator of a likelihood of the accuracy of the calculated defocus amount and is calculated by the focus calculation unit 204. Basically, the reliability level is high when the calculated defocus amount is determined to be reliable, and the reliability level decreases as the calculated defocus amount becomes unreliable. The reliability level according to the present exemplary embodiment is expressed by numerical values from 1 to 4, where 1 indicates the highest reliability and 4 indicates the lowest reliability. Details of the respective reliability levels are as follows.

A case where the reliability level of the defocus amount is "1" is a state where the contrast of the A image signal and the B image signal is high and the shapes of the A image signal and the B image signal are similar (the two-image matching level is high), or a state where the main subject image is already in focus. In this case, driving is performed with reliability on the defocus amount.

A case where the reliability level of the defocus amount is "2" indicates a state where the contrasts of the A image signal and the B image signal are high and the shapes of the A image signal and the B image signal are similar although the reliability level is not as high as "1". Alternatively, it indicates a state where the main subject image is already positioned in the vicinity of an in-focus position within a certain error range. In this case, a target position is determined based on the defocus amount and driving is performed.

A case where the reliability level of the defocus amount is "3" is a state where, although the two-image matching level calculated in the focus calculation unit 204 is lower than a predetermined value, there is a certain tendency in a correlation obtained by relatively shifting the A image signal and the B image signal, and a defocus direction is reliable.

For example, the determination that the reliability level is "3" is often made when there are many small blurs with respect to the main subject.

In a case where neither the defocus amount nor the defocus direction is reliable, the reliability level is determined to be "4". For example, the contrast of the A image signal and the B image signal is low, and the two-image matching level is also low. This is often the case when the subject is largely blurred, and it is difficult to calculate the defocus amount.

Processing Flow of Display of Focus State

The processing flow in the depth priority control unit 215 according to the present exemplary embodiment will now be described with reference to FIG. 7.

In step S701, it is checked whether a pupil of a human or an animal is detected by the detection unit 213 from image data generated from the image pickup element 104. If the pupil is detected (YES in step S701), the processing proceeds to step S702. If the pupil is not detected (NO in step S701), the processing in the depth priority control unit 215 is terminated.

In step S702, it is checked whether both the left and right pupils are detected in the face of a subject detected in step S701. If both the left and right pupils are detected (YES in step S701), the processing proceeds to step S703. If only one of the pupils is detected (NO in step S702), the processing proceeds to step S708.

In step S703, a depth difference between the detected left and right pupils is measured based on the pupil information about both of the pupils and the information of the focus calculation unit 204. Next, the processing proceeds to step S704.

In step S704, the position of the focus lens 121 and the control value of the diaphragm 122 are calculated so that the depth difference measured in step S703 falls within a specific depth (depth of field), and the calculated control value is returned. In a case where there is a restriction, such as there is no control value that enables the depth difference to fall within the specific depth (depth of field) or the control value of the diaphragm 122 cannot be changed due to a setting of the display control apparatus, a calculation result indicating that control is impossible is returned. Next, the processing proceeds to step S705.

In step S705, it is determined, based on the result of step S704, whether both the left and right pupils can be within the specific depth (depth of field). When the determination result indicates that the pupils can be within the specific depth (depth of field) (YES in step S705), the processing proceeds to step S706, and when the determination result indicates that the pupils cannot be within the specific depth (NO in step S705), the processing proceeds to step S708.

In step S706, the position of the focus lens 121 and the diaphragm 122 are operated based on the control values calculated in step S704 to perform control so that both of the pupils are within the specific depth (depth of field). Next, the processing proceeds to step S707.

In step S707, frame display indicating that both the left and right pupils are within the specific depth (depth of field) is performed on an operation screen of the display control apparatus by controlling the display unit 105, and processing in the depth priority control unit 215 is completed.

Step S708 is executed when both the left and right pupils are not detected in the same subject in step S702 and when both the left and right pupils are detected in step S705 but control to include the pupils within the specific depth (depth of field) cannot be performed. When both the left and right pupils are detected, control is performed to focus on a pupil on the near side. When only one pupil is detected, focusing control is performed on that pupil. Next, the processing proceeds to step S709.

In step S709, frame display indicating a pupil is in focus is performed on the pupil focused in step S708. Further, when both the left and right pupils are detected, frame display indicating that a pupil that is not in focus is out of the specific depth is performed with respect to the pupil that is not in focus, and the processing in the depth priority control unit 215 is completed.

Display Example of Focus State

Next, frame display examples of the present exemplary embodiment in steps S707 and S709 of FIG. 7 will be described with reference to FIGS. 8A and 8B. A view (8-A-1) and a view (8-B-1) in the upper part of FIGS. 8A and 8B illustrate front views, and a view (8-A-2) and a view (8-B-2) in the lower part of FIGS. 8A and 8B illustrate top views viewed from the top of the head. FIG. 8A represents a case where both of the pupils are within the specific depth (depth of field), and FIG. 8B represents a case where only one of the pupils is within the specific depth. Since both the left and right pupils are in focus in the views (8-A-1) and (8-A-2), frame displays 800 and 801 indicating that the pupils are in focus are performed on both the left and right pupils (step S707 in FIG. 7). In the case of the views (8-A-1) and (8-A-2), a depth difference 804 between the left and right pupils falls within the depth of field. On the other hand, in the case of views (8-B-1) and (8-B-2), only the left pupil is in focus. A frame display 803 indicating that the left pupil is in focus is performed, and a frame display 802 indicating that the right pupil is outside the specific depth (depth of field) is performed for the right pupil that is not in focus (step S709 in FIG. 7). A depth difference 805 between the left and right pupils is greater than the depth of field. In the examples of FIGS. 8A and 8B, the frame displays 800, 801, and 803 representing the in-focus state are indicated by solid lines, whereas the frame display 802 representing the state where the pupil is outside the specific depth (depth of field) is indicated by broken lines. However, the indication method is not limited thereto. For example, the meaning of each frame may be expressed by difference in color for the frame.

As described above, in the present exemplary embodiment, when both the left and right pupils of the same subject are detected, it is possible to clearly indicate to the user whether both of the pupils are within a specific depth (depth of field). It is possible to meet a need for capturing an image in which both pupils are in focus, which is required in a use case such as portrait imaging.

Figure 10:
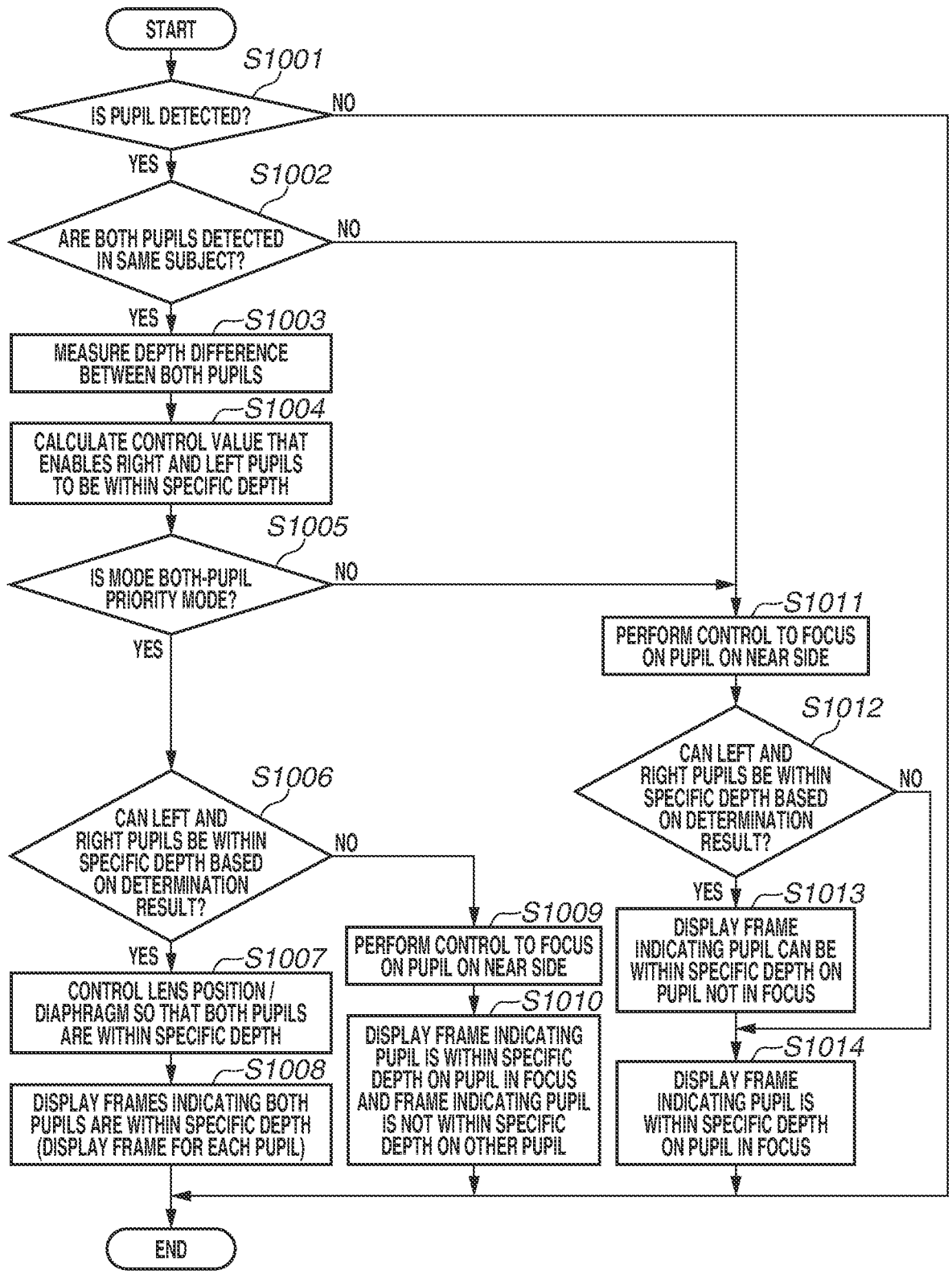
FIG. 10 is a flowchart illustrating a processing flow according to the second exemplary embodiment.

A second exemplary embodiment of the present invention will now be described with reference to FIGS. 9A, 9B, and 10.

Display Example of Focus State

Frame display examples and an operation according to the present exemplary embodiment will be described with reference to FIGS. 9A and 9B. In the first exemplary embodiment, when both the left and right pupils can be brought into focus, the focus lens 121 and the diaphragm 122 are operated and the frames are displayed so as to bring both of the pupils into focus. On the other hand, in the present exemplary embodiment, there are a mode in which only one pupil is preferentially focused (referred to as a one-pupil priority mode in the drawings) and a mode in which both pupils are preferentially focused if possible (referred to as a both-pupil priority mode in the drawings), and a display control apparatus capable of switching between the two modes is assumed.

In FIGS. 9A and 9B, views (9-A-1) and (9-B-1) in the upper part illustrate frame display examples in the case of (1) the both-pupil priority mode, and views (9-A-2) and (9-B-2) in the lower part illustrate frame display examples in the case of (2) the one-pupil priority mode. FIG. 9A illustrate a case where both the left and right pupils can be focused on, and FIG. 9B illustrate a case where only one pupil can be focused on.

In FIGS. 9A and 9B, (1) the both-pupil priority mode illustrated in the upper part is the same as the first exemplary embodiment. The view (9-A-1) is an example in which the position of the focus lens 121 and the diaphragm 122 are operated to perform control so that both of the pupils are within the specific depth (depth of field), and then frame display indicating that both the left and right pupils are within the specific depth (depth of field) is performed on the operation screen of the display control apparatus. The frame display indicating that both the left and right pupils are within the specific depth (depth of field) means that both of the pupils can be brought into focus. In the view (9-B-1), when both the left and right pupils are detected but control to include the pupils within the specific depth (depth of field) cannot be performed, control is performed to focus on a pupil on the near side. Then, a frame display 905 indicating that the left pupil is in focus is performed, and a frame display 904 indicating that the right pupil falls outside of the specific depth (depth of field) and cannot be brought into focus is performed on the right pupil that is not in focus.

In (2) the one-pupil priority mode illustrated in the lower part of FIGS. 9A and 9B, in the case of the view (9-A-2) in which it is determined in the depth priority control unit 215 that both of the pupils can be brought into focus, focusing control is performed on the left pupil located on the near side, and a frame display 903 indicating that the pupil is in focus is performed. For the other pupil, a frame display 902 indicating that focusing control to bring the other pupil within the specific depth (depth of field) is possible is performed.

In the case of the view (9-B-2) in which both of the pupils cannot be brought into focus, focusing control is performed on the left pupil located on the near side, and the frame display 903 indicating that the pupil is in focus is performed. Since the other pupil is not detected, frame display is not performed for the other pupil.

In the example of FIGS. 9A and 9B, the frame display that indicates a pupil is in focus, represented by the frame displays 900, 901, 903, and 905, is indicated by black solid lines, the frame display that indicates that there is a pupil that can be focused on, represented by the frame display 902, is indicated by black dashed lines, and the focusing impossible frame display, represented by the frame display 904, is indicated by gray dashed lines. However, the indication method is not limited thereto as long as the three types of frame display can be distinguished. For example, an indication method in which the color of the frame is changed for each frame type may be used.

Processing Flow of Display of Focus State

The processing flow in the depth priority control unit 215 according to the present exemplary embodiment will now be described with reference to FIG. 10. Description overlapping with the description of the processing flow using FIG. 7 will be omitted.

Figure 7:
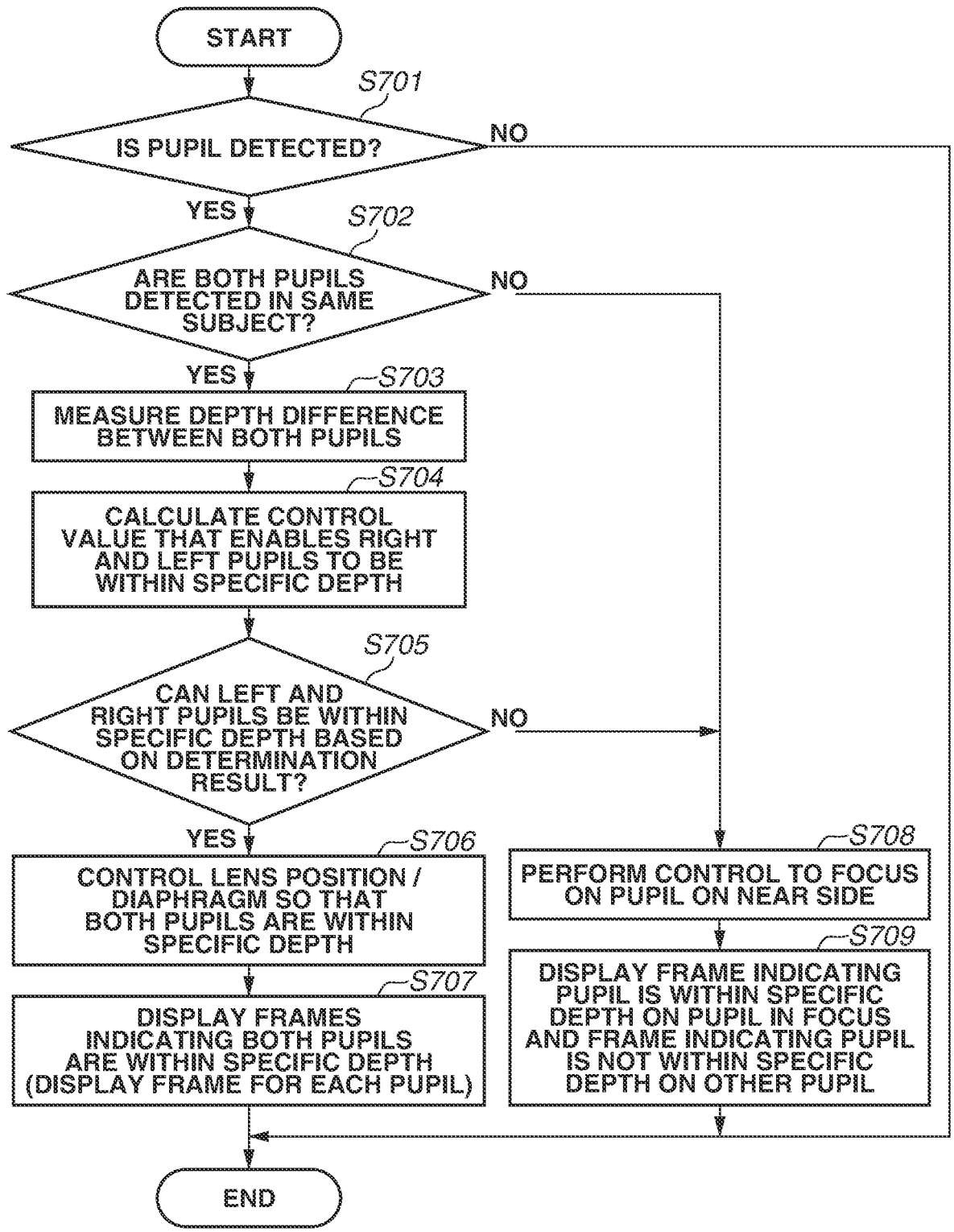
FIG. 7 is a flowchart illustrating a processing flow according to the first exemplary embodiment.

Since steps S1001 to S1004 are the same as those in FIG. 7 referred to in the first exemplary embodiment, description thereof will be omitted.

Next, in step S1005, it is determined whether the setting of the display control apparatus is the both-pupil priority mode. If the both-pupil priority mode is set (YES in step S1005), the processing proceeds to step S1006, and if the one-pupil priority mode is set (NO in step S1005), the processing proceeds to step S1011.

Next, in a case where the processing proceeds to step S1006, the processes of the subsequent processing steps S1007 to 1010 are the same as the processes of steps S706 to S709 described in FIG. 7, and thus the description thereof will be omitted.

Next, a case where the processing proceeds to step S1011 will be described. In step S1011, the focus lens 121 and the diaphragm 122 are controlled so as to focus on the pupil on the near side. Then, the processing proceeds to step S1012.

In step S1012, similarly to step S1006, it is determined whether both the left and right pupils are detected and control to include both of the pupils within the specific depth (depth of field) can be performed. If the determination result indicates that the control is possible (YES in step S1012), the processing proceeds to step S1013, and if not (NO in step S1012), the processing proceeds to step S1014.

Next, step S1013 will be described. Frame display indicating that focusing control to bring the pupil into the specific depth (depth of field) is possible is performed on one pupil that is not in focus of the left and right pupils.

Next, step S1014 will be described. Here, a frame indicating that the pupil is within the specific depth (depth of field) is displayed with respect to the pupil focused based on the control value calculated in step S1004. With the above processing, the processing of the depth priority control unit 215 according to the present exemplary embodiment is completed.

As described above, in the present exemplary embodiment, the processing assuming the display control apparatus having the both-pupil priority mode and the one-pupil priority mode has been described. When both the right and left pupils of the same subject are detected and there is control capable of focusing on both of the pupils even if the one-pupil priority mode is set, frame display indicating that there is control capable of focusing on the pupil which is not focused at that time is performed. With the frame display, it is possible to clearly indicate to the user that both of the pupils can be included in the specific depth (depth of field), and the user can select whether to preferentially focus on one pupil or focus on both of the pupils.

A third exemplary embodiment of the present invention will now be described with reference to FIG. 11.

Example of Focus State Display and Focus Control

Figure 11:
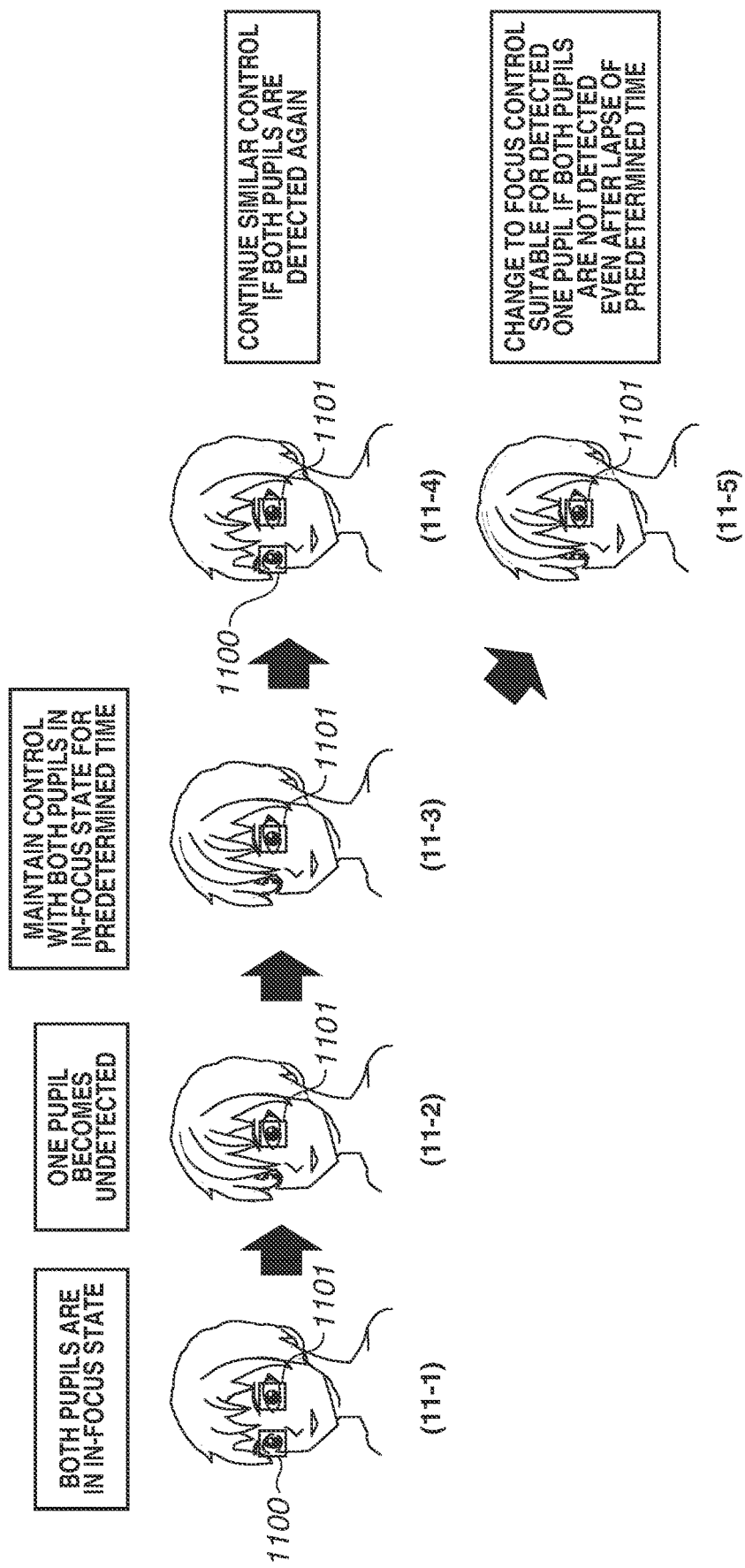
FIG. 11 is a diagram illustrating an example of frame displays and control according to a third exemplary embodiment.

In FIG. 11, a state (11-1) illustrates a state where both the left and right pupils are detected and both of the pupils are in focus, and frame displays 1100 and 1101 indicate that the detected pupils are in focus. In such a situation, in a state (11-2) in FIG. 11, one of the pupils becomes undetected due to, for example, the hair covering one of the pupils, and the frame display on the pupil disappears. However, as illustrated in a state (11-3) of FIG. 11, the focusing control on both of the pupils that has been performed until then is maintained for a certain period of time.

If both of the pupils become detectable again within a certain period of time as illustrated in a state (11-4) in FIG. 11, focusing control on both of the pupils is continued. Further, as illustrated in a state (11-5) in FIG. 11, if the undetected pupil is not detected again even after a lapse of a predetermined time, the control values of the focus lens 121 and the diaphragm 122 are changed to control values suitable for the detected one pupil.

As described above, in the present exemplary embodiment, the control in the case where one pupil becomes undetected from the state where both the left and right pupils are in focus has been described. By performing the above-described control, it is possible to reduce fluctuations of the control values of the focus lens 121 and the diaphragm 122, and to implement stable focusing control.

A fourth exemplary embodiment of the present invention will now be described with reference to FIG. 12.

Adjustment Example of Depth of Field

FIG. 12 illustrates a top view of the head of the subject, where a state (12-1) in FIG. 12 illustrates a case where the subject is stationary and a state (12-2) in FIG. 12 illustrates a case where the subject is moving. Both the state (12-1) and the state (12-2) in FIG. 12 illustrate a situation where both the left and right pupils are in focus. Thus, frame displays 1201 and 1202 indicate the in-focus state. FIG. 12 illustrates differences 1203 and 1206, each denoting a difference between in-focus positions of both of the pupils, positions 1204 and 1207, each denoting the in-focus position, and depths 1205 and 1208, each denoting the specific depth (depth of field). When the subject is moving as illustrated in the state (12-2) in FIG. 12, there is a possibility that the control of the focus lens 121 cannot follow the movement of the subject and both of the pupils deviate from the specific depth (depth of field). Thus, the specific depth (depth of field) 1208 is set to be deeper than the specific depth (depth of field) 1205 in the state (12-1) of FIG. 12. As a method of increasing the depth, it is conceivable to increase a stop amount of the diaphragm 122.

As described above, in the present exemplary embodiment, the specific depth (depth of field) when both the left and right pupils are brought into focus is changed depending on the movement of the subject. As a setting policy of the specific depth (depth of field), it is desirable to set the specific depth deeper when the subject is moving than when the subject is stationary. By setting the specific depth (depth of field) in this way, it is possible to stably maintain the in-focus state of both the left and right pupils even when the subject moves back and forth.

The present invention can be realized by processing in which a program for implementing one or more functions of the above-described exemplary embodiments is supplied to a system or an apparatus via a network or a computer-readable storage medium storing the program, and one or more processors in a computer of the system or the apparatus read and execute the program. The present invention can also be realized by a circuit (for example, an application specific integrated circuit (ASIC)) that implements one or more functions.

In each of the above-described exemplary embodiments, the present invention is applied to a digital single-lens reflex camera. However, the present invention is not limited thereto. The present invention may be applied to any device with an image pickup element attached thereto. More specifically, the present invention can be applied to any apparatus capable of capturing an image, such as a mobile phone terminal, a mobile image viewer, a television including a camera, a digital photo frame, a music player, a game machine, and an electronic book reader.

In addition, in the above-described exemplary embodiments, the interchangeable lens camera has been described, but the camera may be a lens-barrel-bound camera in which a lens barrel and a camera body are integrated.

According to the present invention, it is possible to display in a suitable focus state.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-156671, filed Sep. 29, 2022, which is hereby incorporated by reference herein in its entirety.

What is claimed is:

1. A display control apparatus comprising:
at least one memory storing one or more programs;
at least one processor that, upon execution of the one or more programs, is configured to operate as:
an acquisition unit configured to acquire pupil information from an image obtained by an image capturing unit configured to capture a subject image obtained via an imaging optical system;
a focus detection unit configured to detect a focus state of a subject;
a display control unit configured to perform control to display an index on a display screen based on the pupil information acquired by the acquisition unit; and
a determination unit configured to determine whether a plurality of pupils can be included in a specific depth in a case where pupil information about the plurality of pupils of a same subject is acquired by the acquisition unit,
wherein, in a case where it is determined by the determination unit that the plurality of pupils of the same subject cannot be included in the specific depth, the display control unit performs control so that different indexes are displayed on a pupil within the specific depth and a pupil outside the specific depth.

2. The display control apparatus according to claim 1, wherein execution of the one or more programs further configures the at least one processor to operate as:
 a focus adjustment unit configured to perform focusing control by controlling movement of a focus lens included in the imaging optical system; and
 a diaphragm control unit configured to control driving of a diaphragm included in the imaging optical system,
 wherein the focus adjustment unit and the diaphragm control unit perform control based on a determination result of the determination unit.

3. The display control apparatus according to claim 2, wherein, in a case where acquisition of information about one pupil becomes impossible in a state where the plurality of pupils is within the specific depth, the focus adjustment unit and the diaphragm control unit maintain control to cause the plurality of pupils to be within the specific depth for a certain period of time, and perform control based on the acquired pupil information after a lapse of a certain period of time.

4. The display control apparatus according to claim 2, wherein the focus adjustment unit and the diaphragm control unit change a control value depending on a movement of a subject to be controlled to be within the specific depth.

5. The display control apparatus according to claim 2, wherein the display control apparatus has a mode in which only one of the pupils is preferentially focused and a mode in which both of the pupils are preferentially focused.

6. The display control apparatus according to claim 5,
 wherein, in a mode in which only one of the pupils is preferentially focused, the focus adjustment unit performs focusing control on a left pupil located on a near side, and
 wherein, in a mode in which focusing on both pupils is prioritized, in a case where the determination unit determines that the plurality of pupils of the same subject can be included in the specific depth, the focus adjustment unit and the diaphragm control unit perform control to include the plurality of pupils of the same subject in the specific depth.

7. The display control apparatus according to claim 6, wherein, in a mode in which focusing on both pupils is prioritized, in a case where the determination unit determines that the plurality of pupils of the same subject cannot be included in the specific depth, the focus adjustment unit performs focusing control on the left pupil located on the near side.

8. A display control method comprising:
 acquiring pupil information from an image obtained by an image capturing unit configured to capture a subject image obtained via an imaging optical system;
 detecting a focus state of a subject;
 performing display control to display an index on a display screen based on the pupil information obtained in the acquiring; and
 determining whether a plurality of pupils can be included in a specific depth in a case where pupil information about the plurality of pupils of a same subject is acquired in the acquiring,
 wherein, in the performing display control, in a case where it is determined in the determining that the plurality of pupils of the same subject cannot be included in the specific depth, control is performed so that different indexes are displayed on a pupil within the specific depth and a pupil outside the specific depth.

9. A non-transitory computer-readable storage medium storing a program for causing a computer to execute a display control method, the display control method comprising:
 acquiring pupil information from an image obtained by an image capturing unit configured to capture a subject image obtained via an imaging optical system;
 detecting a focus state of a subject;
 performing display control to display an index on a display screen based on the pupil information obtained in the acquiring; and
 determining whether a plurality of pupils can be included in a specific depth in a case where pupil information about the plurality of pupils of a same subject is acquired in the acquiring,
 wherein, in the performing display control, in a case where it is determined in the determining that the plurality of pupils of the same subject cannot be included in the specific depth, control is performed so that different indexes are displayed on a pupil within the specific depth and a pupil outside the specific depth.

* * * * *